UNITED STATES PATENT OFFICE.

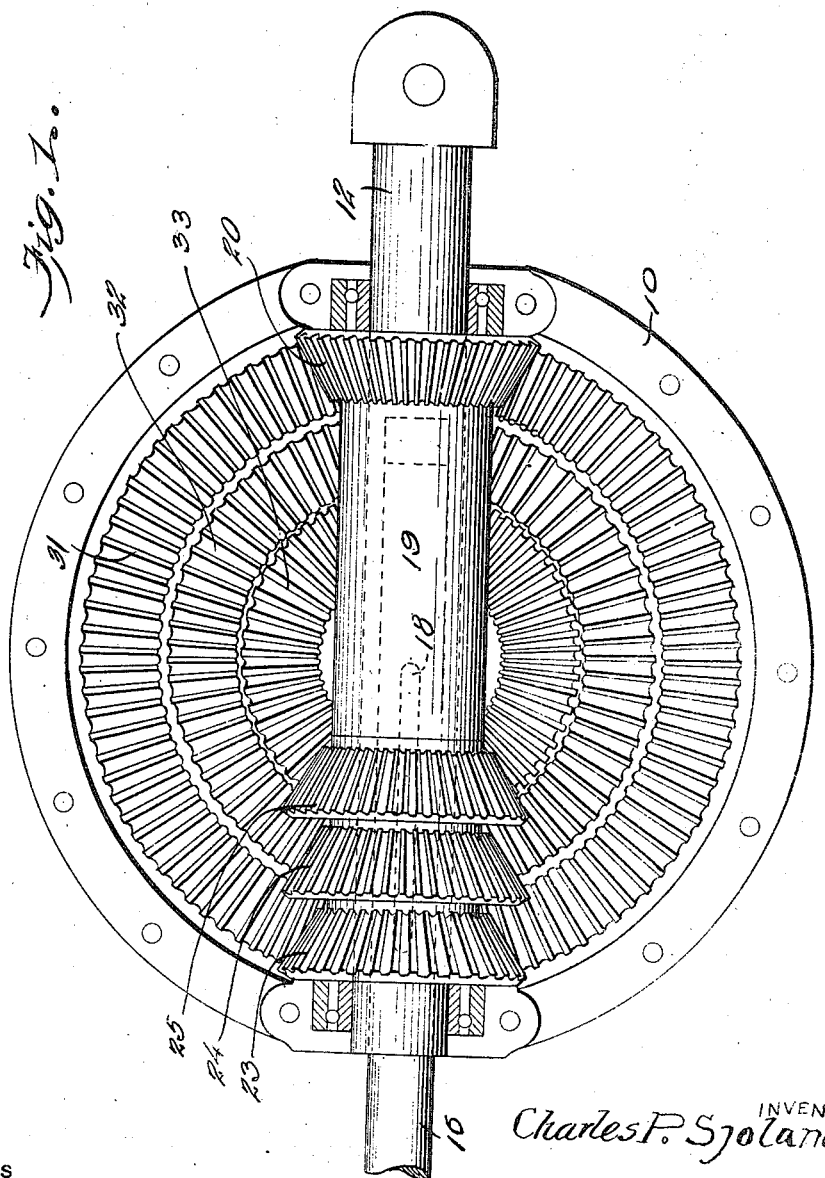

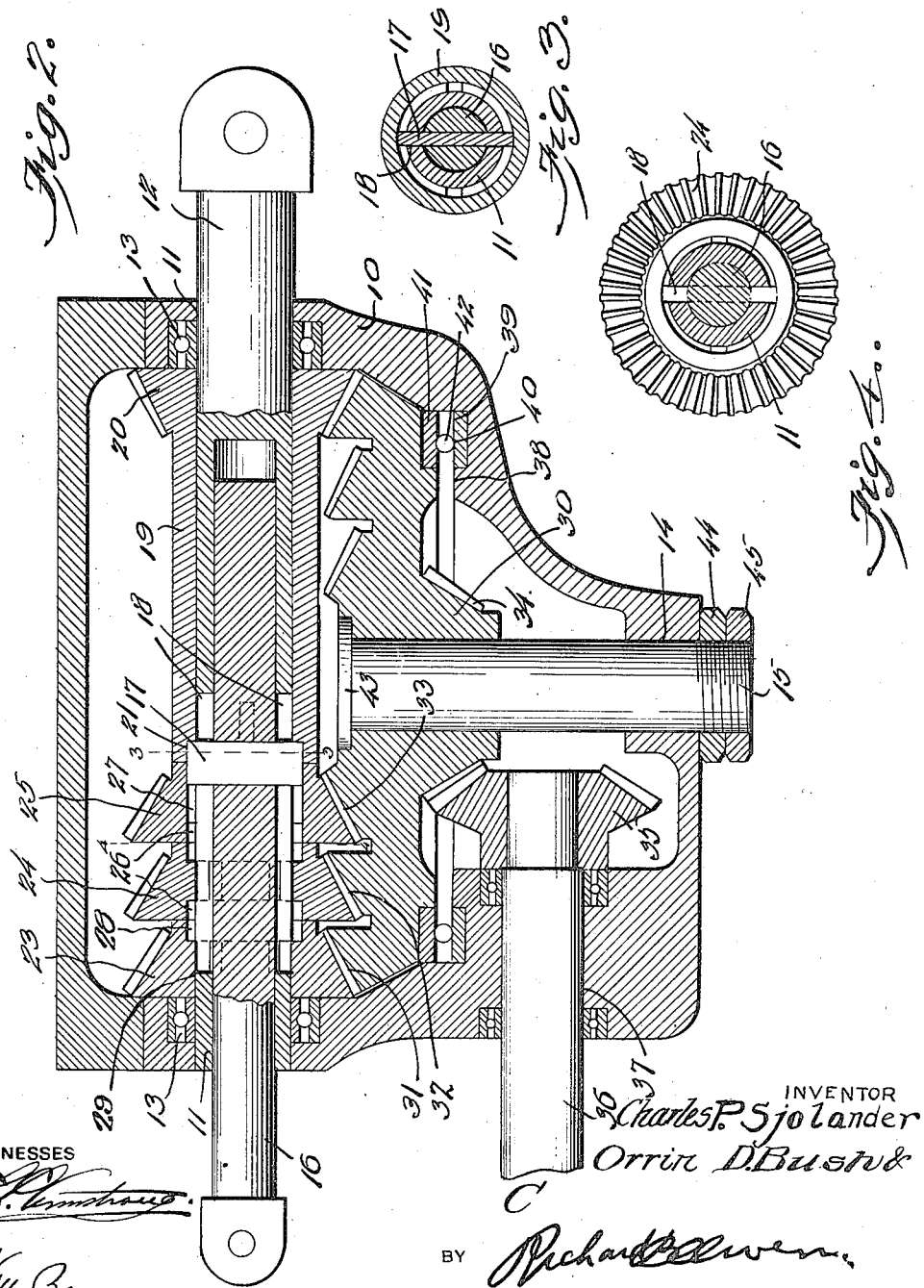

CHARLES P. SJOLANDER AND ORRIN D. BUSH, OF MAMMOTH, CALIFORNIA.

TRANSMISSION-GEAR.

1,261,307.

Specification of Letters Patent.

Patented Apr. 2, 1918.

Application filed August 14, 1917. Serial No. 186,190.

*To all whom it may concern:*

Be it known that we, CHARLES P. SJO-LANDER and ORRIN D. BUSH, citizens of the United States, residing at Mammoth, in the county of Shasta and State of California, have invented certain new and useful Improvements in Transmission-Gears, of which the following is a specification.

This invention has relation to variable speed transmissions for the transmission of power in vehicles, boats, and for the transmission of power to any kind of machinery, and has for an object to provide a device of this character embodying a plurality of constantly meshing gears of different ratios with means for selecting any ratio desired, thereby providing a noiseless transmission.

Another object of the invention is to provide a transmission having the above named characteristics and embodying novel means—whereby any gear of the set may be selected and locked to the driving shaft to utilize said gear selected for the transmission of power.

A still further object of the invention is to provide a variable speed transmission gear comprising two parts, with elements arranged and designed with a view to reducing friction, to permit the rapid assembly or disassociation of the parts, to permit economical and efficient lubrication, and to permit manufacture of the device at a reduced cost as compared to devices of a similar character heretofore provided.

In addition to the foregoing our invention comprehends improvements in the details of construction and arrangement of the parts to be hereinafter more fully described and particularly set forth in the appended claim.

In the accompanying drawings in which similar and corresponding parts are designated by the same characters of reference throughout the several views in which they appear;

Figure 1, is a view illustrating the interior of a variable speed transmission gearing constructed in accordance with our invention, the cover of the casing being removed for that purpose disclosing the transmission gears.

Fig. 2, is a view of the gearing in longitudinal section and

Figs. 3 and 4, are detail sections taken on the lines 3—3 and 4—4 respectively of Fig. 2.

With reference to the drawings, 10 indicates a circular hollow casing having a pair of diametrically opposed openings 11 formed in the side wall to permit the insertion therethrough of a drive shaft 12. The walls are recessed around said openings to receive anti-friction bearings 13. An opening 14 is formed in the bottom of the casing to receive a driven shaft 15, the center of which shaft intersects the center of the drive shaft at right-angles thereto.

The drive shaft is recessed longitudinally to receive a speed changing rod 16 slidably held therein, a key 17 extending transversely through said rod with the extremity of said key entering a pair of longitudinally extending slots 18 formed in the drive shaft to permit sliding movement of the rod relative to the shaft but to preclude relative rotation of said rod and shaft. A sleeve 19 is embraced about the drive shaft and extends from a point adjacent the intermediate portion of the shaft to one wall of the transmission casing, said end of the sleeve adjacent the wall of the transmission casing having a bevel gear 20 integrally formed therewith, said gear constituting the reverse gear. The end of the sleeve 19 opposite the end bearing the reversing gear is formed with an annular recess 21 designed to receive the extremities of the key 17 which projects through the slots 18 and extends beyond the surface of the drive shaft for that purpose, a pair of longitudinally extending recesses are furthermore formed at diametrically opposite points from the inner surface of the sleeve 19, in communication with the annular recess, said slots being indicated at 22.

Low, intermediate and high speed gears 23, 24 and 25 respectively are mounted upon the drive shaft, said gears being preferably bevel gears, the gears 24 and 25 having an annular recess 26 at each end which recesses are connected by means of longitudinally extending slots 27. It will be noted that between the gears 24 and 25, and between the gears 25 and end of the sleeve 19, the recesses of said gears and the recess 21 of the sleeve coact to form a relatively wide recess which is of a width corresponding to the width of the key 17, the slots 27 connecting said recesses being of a width to correspond to thickness of the key whereby to permit passage therethrough of the terminals of the key in a manner which will be presently noted. The low speed gear 23 is formed with a recess 28 in one end which, in connection with the recess 26 of the next adjacent gear forms a relatively wide annular recess to receive the terminals of the key, said gear 23 being also provided with a pair of longitudinally extending slots 29 in communication with its annular recess 28 for a purpose analogous to the purpose of the slot 27.

A circular gear 30 is mounted upon the inner end of the drive shaft 15, the face of said gear being provided with three series of concentric annular gears indicated at 31, 32 and 33 designed mechanically for meshing engagement with the gears 23, 24 and 25 respectively. The three series of teeth on the gear 30 form in effect three bevel gears which are integrally formed. The hub of the gear 30 is furthermore provided with an annular series of teeth 34 on the side of said gear 30 opposite the side bearing the three series of teeth for meshing engagement with a gear 35 which is mounted on a shaft 36 journaled in an opening 37 formed in one wall of the casing, said shaft 36 being adapted to be connected to the differential or other means for driving the wheels of a vehicle, the propeller of a boat, etc.

The casing is formed with a ledge 38 which supports an annular ring 39 formed with a groove 40 which is disposed opposite a similar groove formed in an annular plate 41 fixed to one face of the gear 30, said grooves forming a raceway to receive spherical bearing members 42. The inner end of the drive shaft is formed with an enlarged head 43 while the opposite end of the shaft is threaded to receive a nut 44 which engages the outer surface of the casing and which when tightened holds the gear 30 upon the antifriction gearing. A jam nut 45 may be applied to the shaft to prevent dislodgement of the nut 44.

The source of power is connected to the drive shaft 12 by universal joint or other connection, and the rod 16 may be connected by means of a swivel joint or the like to a lever (not shown) for shifting said rod. It will be noted that in the position of the parts shown in Fig. 2 wherein sleeve 17 is located so as to dispose its extremities in the annular groove 26 of the gear 25 and the annular groove 21 of the sleeve 19, although the drive shaft 12 may be rotated constantly, there will be no application of power either to the sleeve 19 or the gear 25.

To effect a transmission at high speed, the rod 16 is shifted so as to engage the terminals of the key 17 in the slot 27 of the gear 25 thereby locking the drive shaft to said gear whereby rotation of said gear may be transmitted to the gear 30, thence to the gear 35 in the shaft 36. To obtain a decrease of speed the rod 16 is drawn outward so as to dispose the key 17 in either the slot 27 of the gear 24 or the slot 28 of the gear 23 so as to lock either of said gears to the drive shaft. A transmission of power in a reverse direction may likewise be effected by moving the rod to an extreme inward position so as to engage the key 17 in the slot 22 of the sleeve 19 to lock said sleeve to the drive gear, and owing to the fact that the bevel gear 20 formed on the said sleeve is at a point diametrically opposite the gears 23, 24 and 25, a rotative movement of the gear 30 in a reverse direction will be obtained.

It will be noted that we have provided a novel form of variable speed transmission gearing which includes gears of different ratios constantly in meshing engagement thereby obviating the noise and wear caused by the engagement and reëngagement of the gears of a transmission of the shifting gear type, without the disadvantages of the transmission of the planetary type. It will furthermore be noted that a novel antifriction means is provided for the large bevel gear 30 to take up end thrust caused by action of the gears 23, 24, and 25. Other advantages will be apparent to those skilled in the art to which this invention appertains.

While we have illustrated and described our invention with some degree of particularity various alterations thereover may be made and we therefore desire to reserve the right and privilege of changing the form of the details of construction, or otherwise altering the arrangement of the correlative parts without departing from the spirit of the invention or the scope of the appended claim.

Having thus described our invention what we claim as new and desire to secure by Letters Patent is:—

In a variable speed transmission mechanism, a hollow drive shaft, a rod telescopically engaged therein, a key carried by said rod, a plurality of gears fixedly mounted on the driven shaft, a sleeve mounted on said drive shaft normally rotatable relative thereto and carrying a reverse gear for meshing engagement with one of the gears of the driven shaft, a plurality of gears loosely mounted on the drive shaft for meshing engagement with gears of the driven shaft to effect a transmission of power at variable speeds, certain of the gears of the drive shaft having a pair of annular recesses and longitudinally extending keyways carrying the same, and means for sliding the rod whereby the key may be engaged in any one of the key-ways to lock any of said gears to the drive shaft, said key when engaged in the annular recesses permitting rotation of the drive shaft relative to the gears.

In testimony whereof we affix our signatures in presence of witnesses.

CHARLES P. SJOLANDER.
ORRIN D. BUSH.

Witnesses:
ALVA P. WARRENS,
W. W. MIDDLETON,
ALFRED W. BUSH,
GEO. L. LACY.